(12) United States Patent
Nesbitt et al.

(10) Patent No.: US 9,771,868 B2
(45) Date of Patent: Sep. 26, 2017

(54) SOUND ATTENUATION APPARATUS AND METHOD

(71) Applicant: THE BOEING COMPANY, Chicago, IL (US)

(72) Inventors: Eric H. Nesbitt, Duvall, WA (US); Justin H. Lan, Bothell, WA (US); Thonse R. S. Bhat, Renton, WA (US); Charles W. Rust, Seattle, WA (US)

(73) Assignee: The Boeing Company, Chicago, IL (US)

( * ) Notice: Subject to any disclaimer, the term of this patent is extended or adjusted under 35 U.S.C. 154(b) by 161 days.

(21) Appl. No.: 14/804,577

(22) Filed: Jul. 21, 2015

(65) Prior Publication Data

US 2017/0022903 A1 Jan. 26, 2017

(51) Int. Cl.
*F02C 7/045* (2006.01)
*F02C 7/24* (2006.01)
*F02K 1/34* (2006.01)
*F02K 1/82* (2006.01)
*B64C 1/40* (2006.01)
(Continued)

(52) U.S. Cl.
CPC .................. *F02C 7/24* (2013.01); *B64C 1/40* (2013.01); *B64D 29/02* (2013.01); *B64D 33/06* (2013.01); *F01D 25/24* (2013.01); *F02C 7/045* (2013.01); *F02K 1/827* (2013.01); *B64D 29/08* (2013.01); *F05D 2220/323* (2013.01);
(Continued)

(58) Field of Classification Search
CPC ... F02C 7/24; F02C 7/045; B64C 1/40; F05D 2220/323; F05D 2260/962; F05D 2260/963

USPC .............. 181/292, 288, 290, 213, 214, 222; 244/53 B, 119
See application file for complete search history.

(56) References Cited

U.S. PATENT DOCUMENTS 2,988,302 A * 6/1961 Smith .................. B64C 21/025
181/220
3,542,152 A 11/1970 Adamson et al.
(Continued)

FOREIGN PATENT DOCUMENTS

EP 0895222 2/1999
EP 2517959 10/2012
(Continued)

OTHER PUBLICATIONS

Bielak, et al. "NASA / CR-1999-209002; Advanced Turbofan Duct Liner Concepts", National Aeronautics and Space Administration, Langley Research Center Contract NAS1-20090, Feb. 1999.
(Continued)

*Primary Examiner* — Edgardo San Martin
(74) *Attorney, Agent, or Firm* — Perman & Green LLP

(57) ABSTRACT

An aircraft engine sound attenuation apparatus includes a perforated face member, a backing member, a plurality of connecting members coupling the perforated face member to the backing member to form a plurality of channels spanning from the perforated face member to the backing member, and a bulk absorber disposed in each of the plurality of channels, wherein the plurality of channels are connected to an interior portion of an aircraft engine nacelle component so that the plurality of channels are oriented in a direction substantially normal to a direction of fluid flow pressure drop passing through the aircraft engine.

21 Claims, 9 Drawing Sheets

(51) Int. Cl.
*B64D 29/02* (2006.01)
*F01D 25/24* (2006.01)
*F02C 7/00* (2006.01)
*B64D 29/08* (2006.01)

(52) U.S. Cl.
CPC .. *F05D 2250/283* (2013.01); *F05D 2250/313* (2013.01); *F05D 2260/962* (2013.01)

(56) References Cited

U.S. PATENT DOCUMENTS

| | | | | |
|---|---|---|---|---|
| 3,890,060 | A * | 6/1975 | Lipstein | F04D 29/664 |
| | | | | 181/214 |
| 4,130,175 | A | 12/1978 | Hehmann | |
| 4,235,303 | A | 11/1980 | Dhoore et al. | |
| 4,298,090 | A | 11/1981 | Chapman | |
| 4,441,578 | A | 4/1984 | Rose | |
| 4,531,362 | A * | 7/1985 | Barry | F01D 25/06 |
| | | | | 415/119 |
| 4,751,979 | A * | 6/1988 | Wiseman | F02C 7/24 |
| | | | | 181/213 |
| 4,828,175 | A * | 5/1989 | Heufler | F25C 3/04 |
| | | | | 181/202 |
| 4,947,958 | A * | 8/1990 | Snyder | B32B 15/04 |
| | | | | 181/213 |
| 5,414,232 | A * | 5/1995 | Wilson | B32B 3/12 |
| | | | | 181/210 |
| 5,543,198 | A * | 8/1996 | Wilson | B32B 3/12 |
| | | | | 181/292 |
| 5,594,216 | A * | 1/1997 | Yasukawa | F02C 7/045 |
| | | | | 181/213 |
| 5,706,651 | A * | 1/1998 | Lillibridge | B64D 33/06 |
| | | | | 181/220 |
| 6,439,340 | B1 * | 8/2002 | Shirvan | G10K 11/172 |
| | | | | 181/213 |
| 6,615,576 | B2 | 9/2003 | Sheoran et al. | |
| 6,672,424 | B2 | 1/2004 | Gadefait et al. | |
| 7,267,297 | B2 | 9/2007 | Campbell et al. | |
| 7,431,125 | B2 | 10/2008 | Williams | |
| 7,448,133 | B2 | 11/2008 | Williams et al. | |
| 8,037,967 | B2 | 10/2011 | Mercat | |
| 8,220,588 | B2 * | 7/2012 | Thrash | B64D 29/00 |
| | | | | 181/290 |
| 8,413,922 | B2 * | 4/2013 | Porte | B64D 15/04 |
| | | | | 181/214 |
| 8,579,225 | B2 * | 11/2013 | Mardjono | F02C 7/24 |
| | | | | 181/288 |
| 8,602,346 | B2 * | 12/2013 | Porte | B64D 33/02 |
| | | | | 244/1 N |
| 8,727,707 | B2 | 5/2014 | Schwaller | |
| 8,733,500 | B1 * | 5/2014 | Ayle | G10K 11/172 |
| | | | | 181/284 |
| 8,763,751 | B2 * | 7/2014 | Starobinski | B64D 33/06 |
| | | | | 181/213 |
| 8,820,477 | B1 * | 9/2014 | Herrera | F02C 7/045 |
| | | | | 181/284 |
| 8,840,059 | B2 | 9/2014 | Vauchel et al. | |
| 8,899,512 | B2 * | 12/2014 | Vauchel | B64D 33/02 |
| | | | | 244/1 N |
| 9,127,452 | B1 * | 9/2015 | Winfield | B32B 5/022 |
| 9,260,859 | B2 * | 2/2016 | Matan | E04B 1/84 |
| 9,403,599 | B2 * | 8/2016 | Binks | B64D 29/08 |
| 2002/0139120 | A1 | 10/2002 | Sheoran et al. | |
| 2005/0263346 | A1 | 12/2005 | Nishimura | |
| 2007/0272483 | A1 | 11/2007 | Morin et al. | |
| 2010/0213002 | A1 | 8/2010 | Oboodi et al. | |
| 2011/0133025 | A1 | 6/2011 | Vauchel et al. | |
| 2011/0244150 | A1 | 10/2011 | Thrash et al. | |
| 2011/0303786 | A1 | 12/2011 | Starobinski et al. | |
| 2012/0090693 | A1 * | 4/2012 | Chelin | B64D 15/04 |
| | | | | 137/15.1 |
| 2012/0168248 | A1 | 7/2012 | Burak et al. | |
| 2012/0273611 | A1 * | 11/2012 | Francisco | B64D 33/06 |
| | | | | 244/1 N |
| 2014/0133964 | A1 | 5/2014 | Ayle | |
| 2015/0292413 | A1 | 10/2015 | Soria et al. | |
| 2015/0377128 | A1 | 12/2015 | Copiello | |
| 2016/0024963 | A1 * | 1/2016 | Lumbab | B64D 29/02 |
| | | | | 415/119 |
| 2016/0039528 | A1 * | 2/2016 | Caruel | F02K 1/64 |
| | | | | 415/119 |

FOREIGN PATENT DOCUMENTS

| | | |
|---|---|---|
| WO | 9101034 | 1/1991 |
| WO | 9108379 | 6/1991 |
| WO | 2008069844 | 6/2008 |
| WO | 2010012900 | 2/2010 |
| WO | 2010040837 | 4/2010 |

OTHER PUBLICATIONS

European Search Report, European Application No. 161749907, dated Dec. 15, 2016.
European Search Report, European Application No. 161749914, dated Dec. 15, 2016.

* cited by examiner

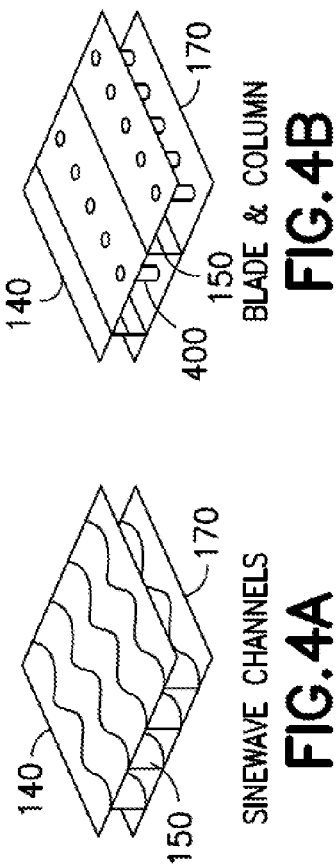
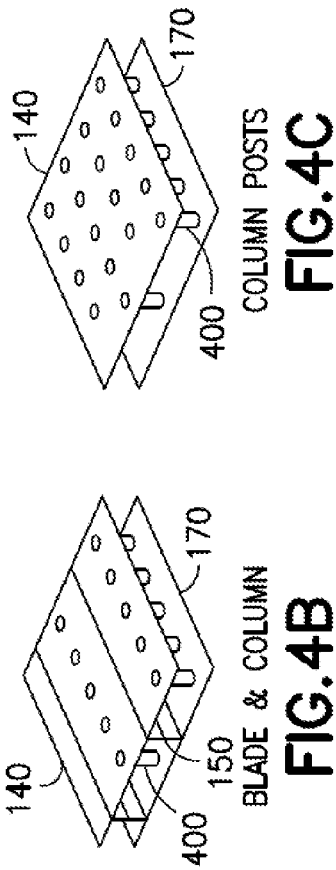
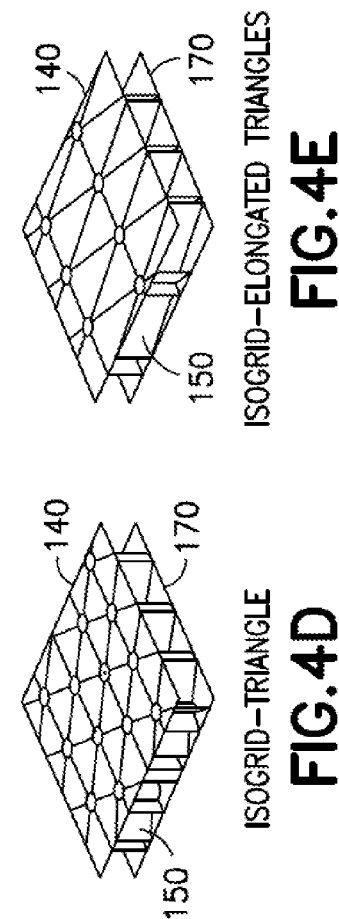
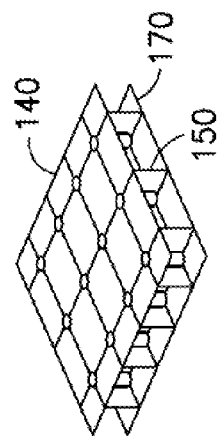
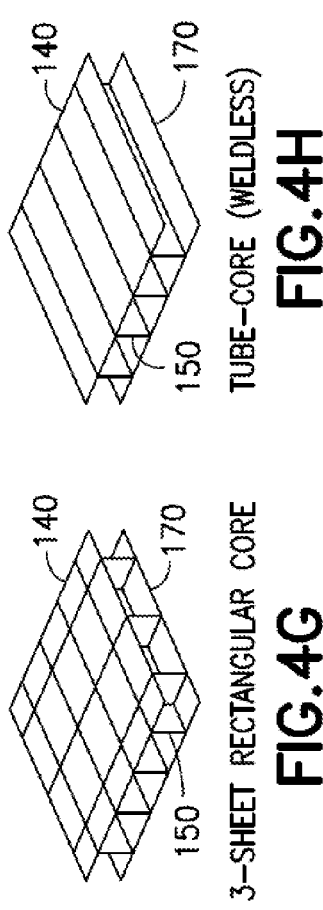
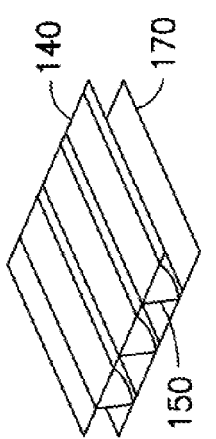

SOUND ATTENUATION APPARATUS AND METHOD

BACKGROUND

Generally, turbine engines, such as used in aircraft, can be sources of unwanted noise while the aircraft is parked or taxying at the airport or during takeoff and landing. Various noise reduction methods have been implemented to address the unwanted noise generated by the turbine engines. One such noise reduction method includes the use of acoustic liners that include Helmholtz resonators or bulk noise suppression material. The acoustic liners are flat or contoured and are generally placed on the interior surface of an engine or an auxiliary power unit inlet and/or exhaust ducts, as necessary, to reduce noise produced by the engine or auxiliary power unit. The bulk noise suppression material has not generally been implemented with respect to turbine engines due to, for example, liquid absorption/retention.

SUMMARY

Accordingly, apparatus and method, intended to address the above-identified concerns, would find utility.

One example of the present disclosure relates to an aircraft engine sound attenuation apparatus that comprises a perforated face member; a backing member; a plurality of connecting members coupling the perforated face member to the backing member to form a plurality of channels spanning from the perforated face member to the backing member; and a bulk absorber disposed in each of the plurality of channels; wherein the plurality of channels are connected to an interior portion of an aircraft engine nacelle component so that the plurality of channels are oriented in a direction substantially normal to a direction of fluid flow pressure drop passing through the aircraft engine.

One example of the present disclosure relates to an aircraft engine that comprises a nacelle having a nacelle frame to which a plurality of nacelle components are attached; at least one sound attenuating member, each sound attenuating member including a perforated face member, a backing member, a plurality of connecting members coupling the perforated face member to the backing member to form a plurality of channels spanning from the perforated face member to the backing member; and a bulk absorber disposed in each of the plurality of channels; wherein the plurality of channels are connected to an interior portion of a respective one of the plurality of nacelle components so that the plurality of channels are oriented in a direction substantially normal to a direction of fluid flow pressure drop passing through the aircraft engine.

One example of the present disclosure relates to a method for aircraft engine sound attenuation, the method comprising: flowing fluid through an aircraft engine nacelle; receiving at least a portion of the fluid in perforations of the aircraft engine nacelle so that the portion of the fluid flows through the perforations into at least one channel of the aircraft engine nacelle; and attenuating acoustic waves with a bulk absorber disposed within each of the at least one channel.

BRIEF DESCRIPTION OF THE DRAWINGS

Figure 1:
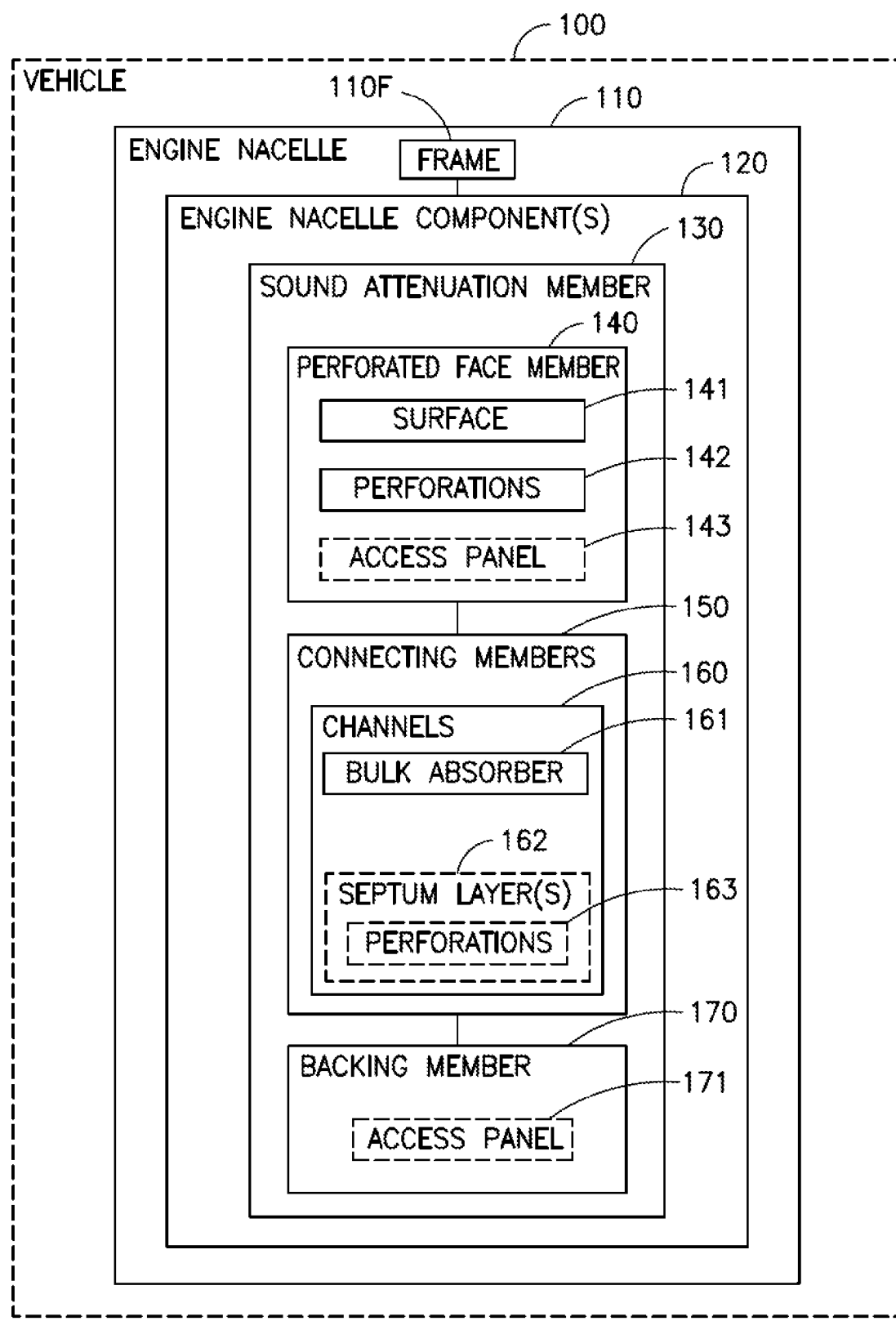
Figure 2A:
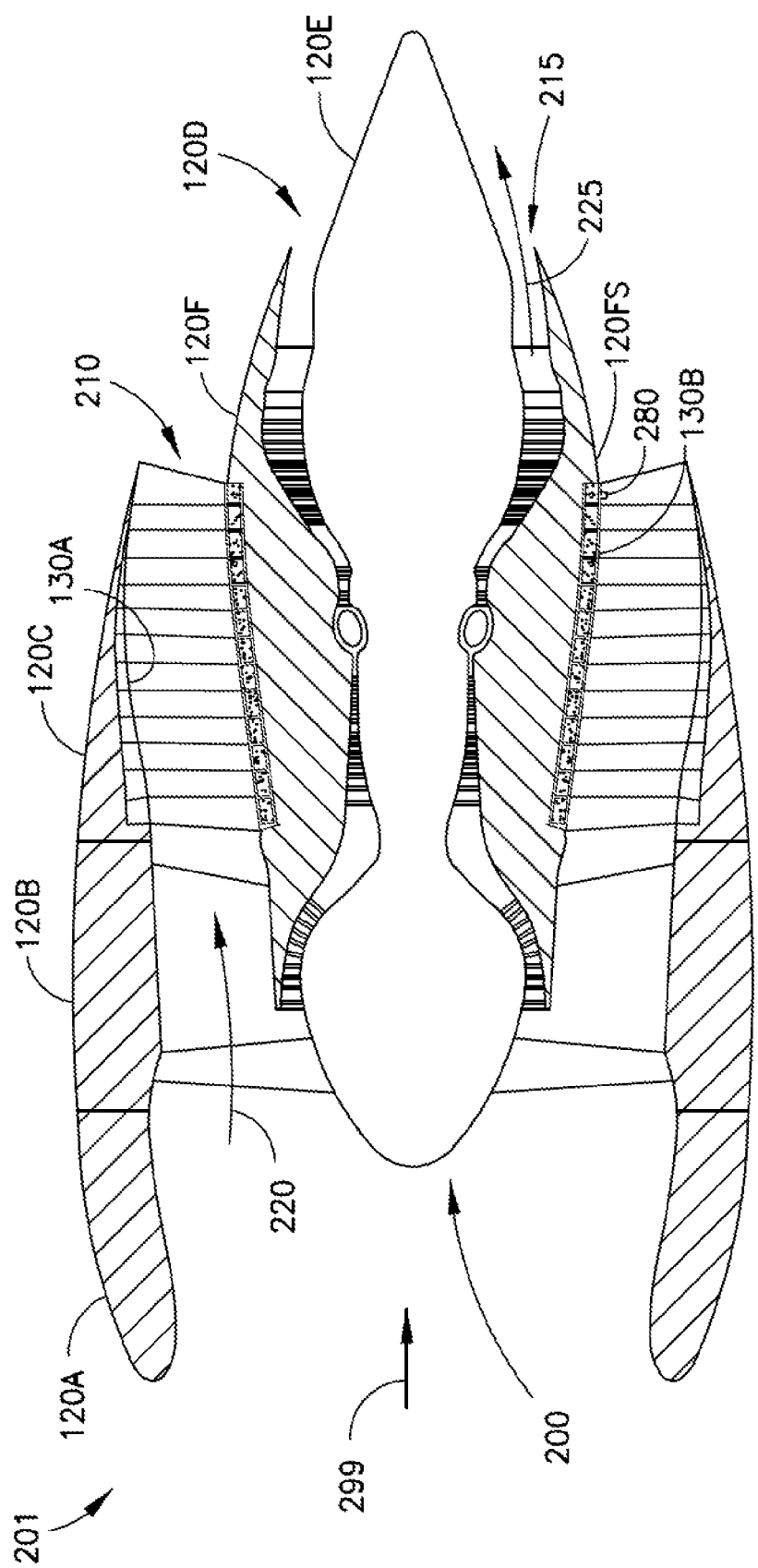
Figure 2B:
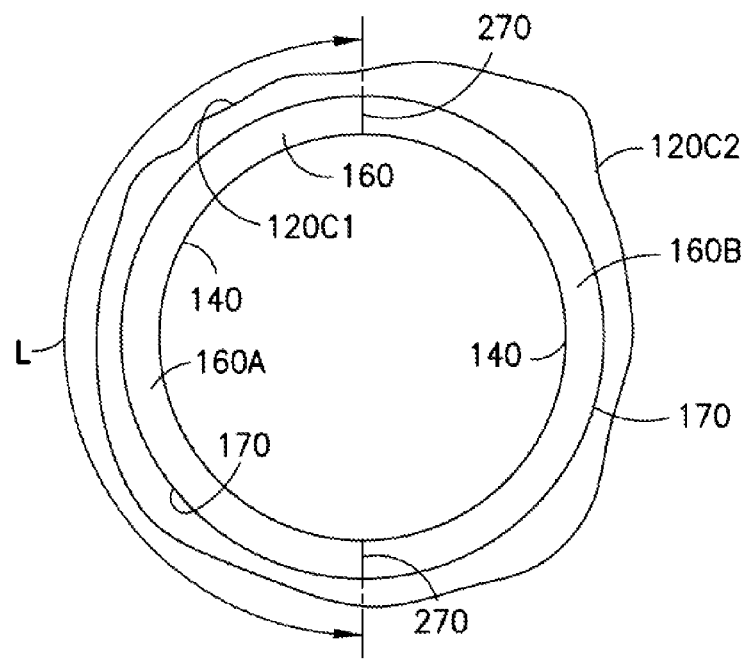
Figure 2C:
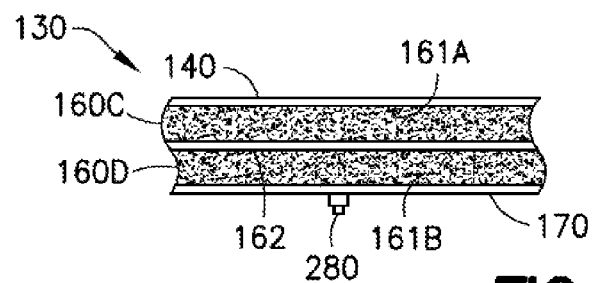
Figure 2D:
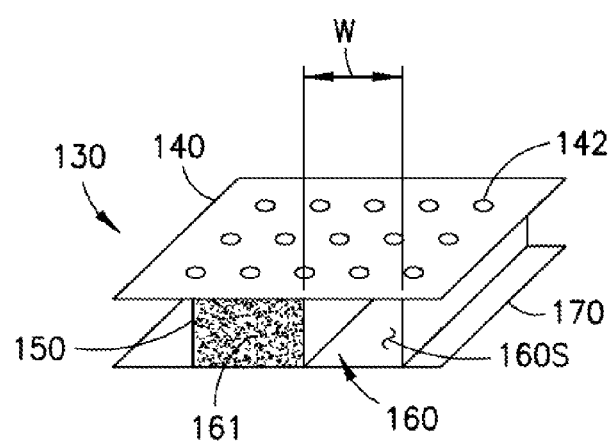
Figure 3:
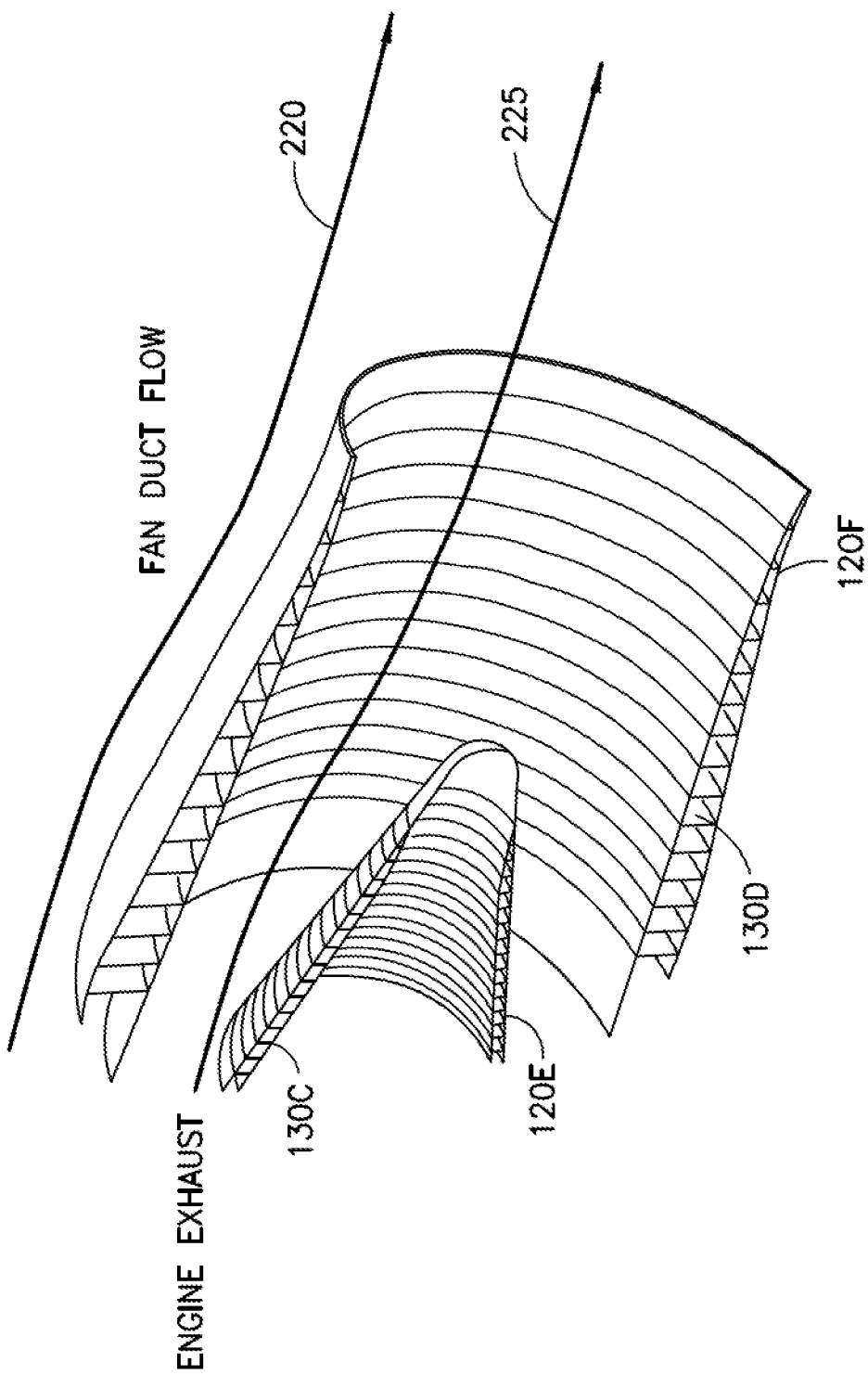
Figure 5:
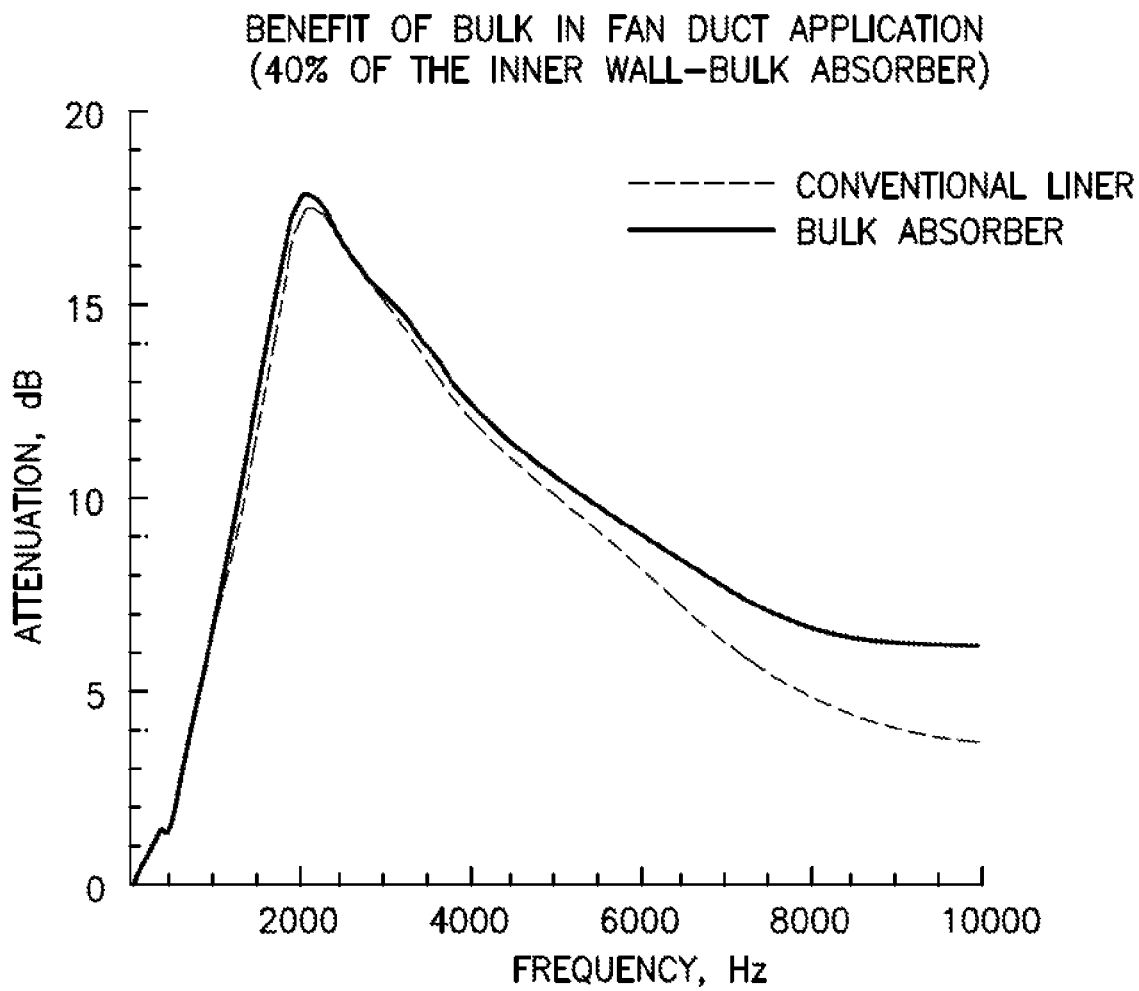
Figure 6:
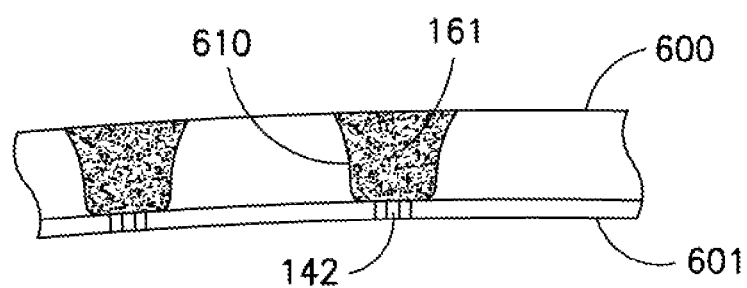

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a sound attenuation apparatus, according to aspects of the present disclosure;

FIG. 2A is a cross sectional schematic illustration of an engine and nacelle, according to aspects of the present disclosure;

FIG. 2B is a cross sectional schematic illustration of a portion of a nacelle, according to aspects of the present disclosure;

FIG. 2C is a cross sectional schematic illustration of a portion of a nacelle, according to aspects of the present disclosure;

FIG. 2D is a schematic illustration of a portion of a sound attenuating member, according to aspects of the present disclosure;

FIG. 3 is a cross sectional perspective schematic illustrations of a portion of a nacelle, according to aspects of the present disclosure;

FIGS. 4A-4I are schematic illustrations of a portion of the sound attenuation apparatus, according to aspects of the present disclosure;

FIG. 5 is a graph illustrating sound attenuation of the sound attenuation apparatus, according to aspects of the present disclosure;

FIG. 6 is a schematic illustration of a sound attenuating member integrated with a frame of a vehicle, according to aspects of the present disclosure.

Figure 7:
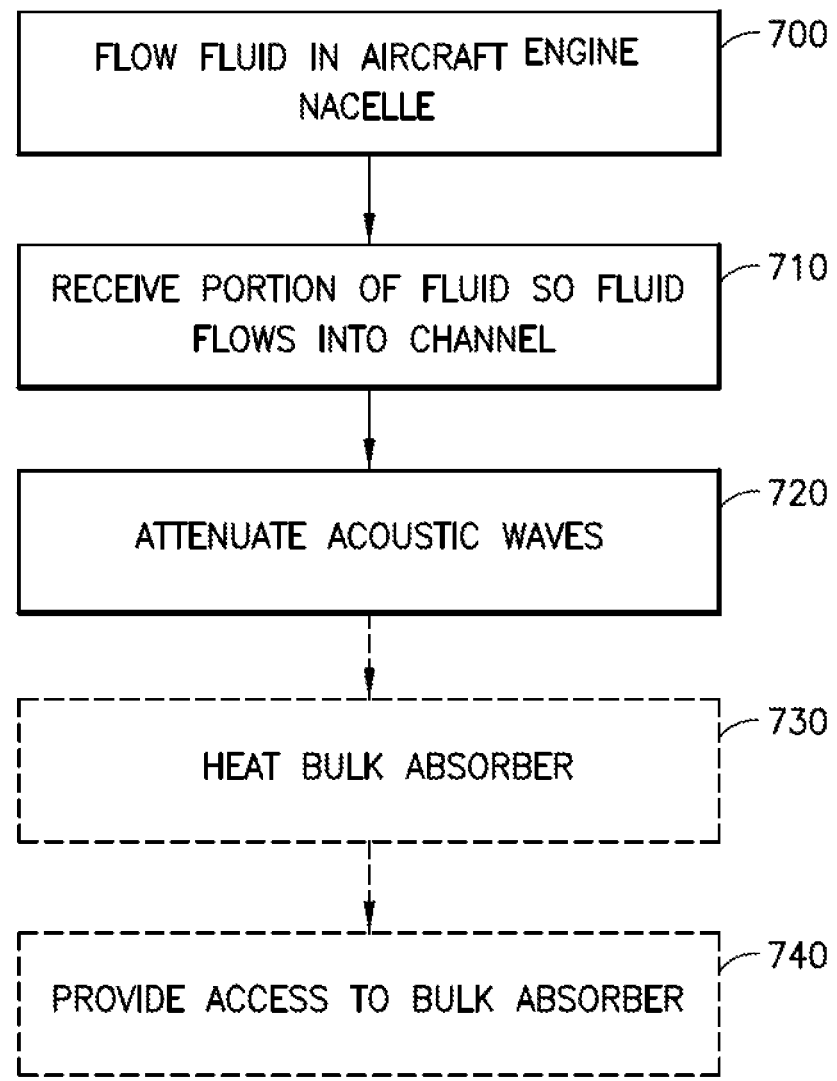
Figure 8:
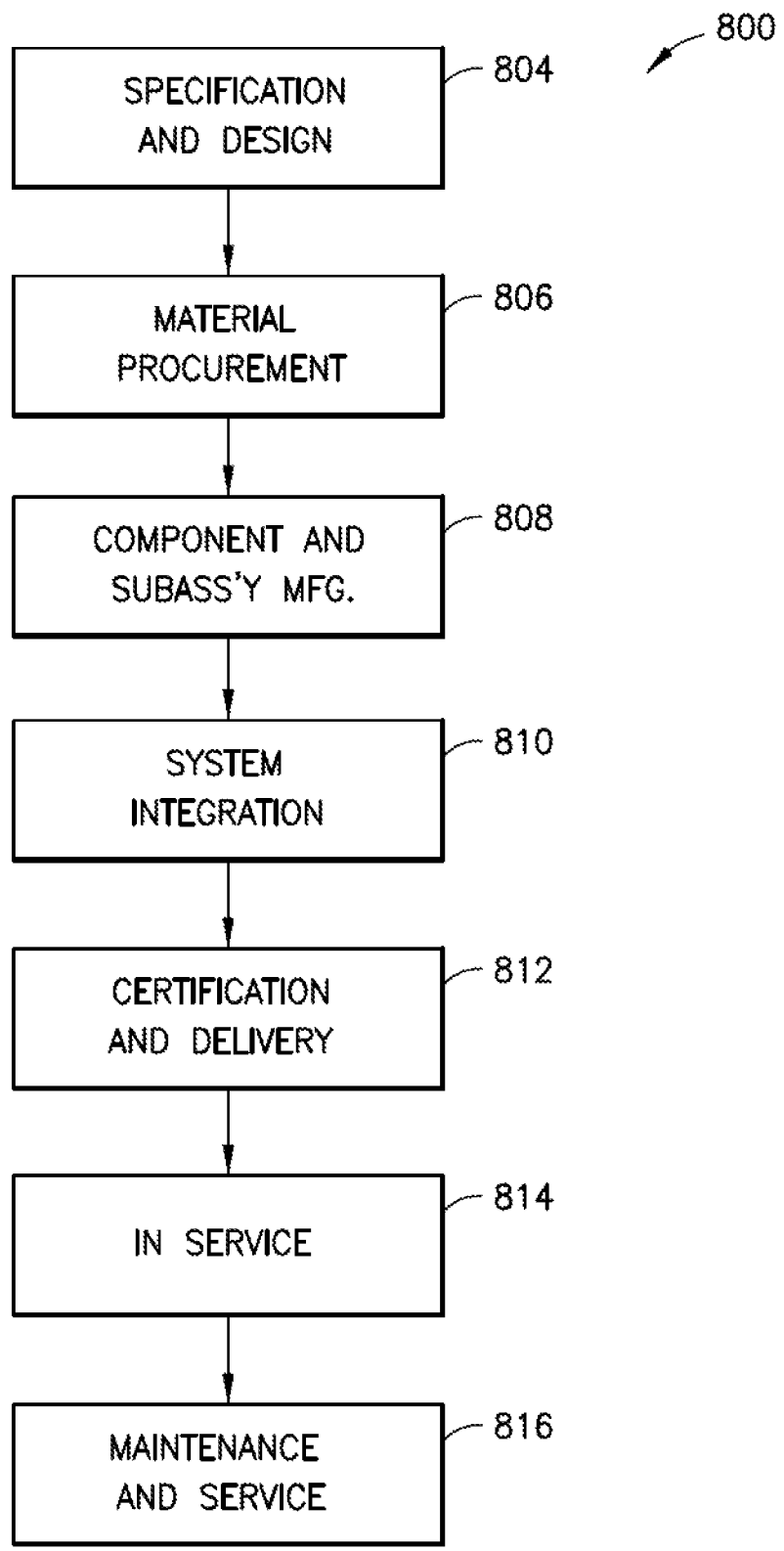

FIG. 7 is a flow diagram of a method, according to aspects of the present disclosure;

FIG. 8 is a flow diagram of aircraft production and service methodology; and

Figure 9:
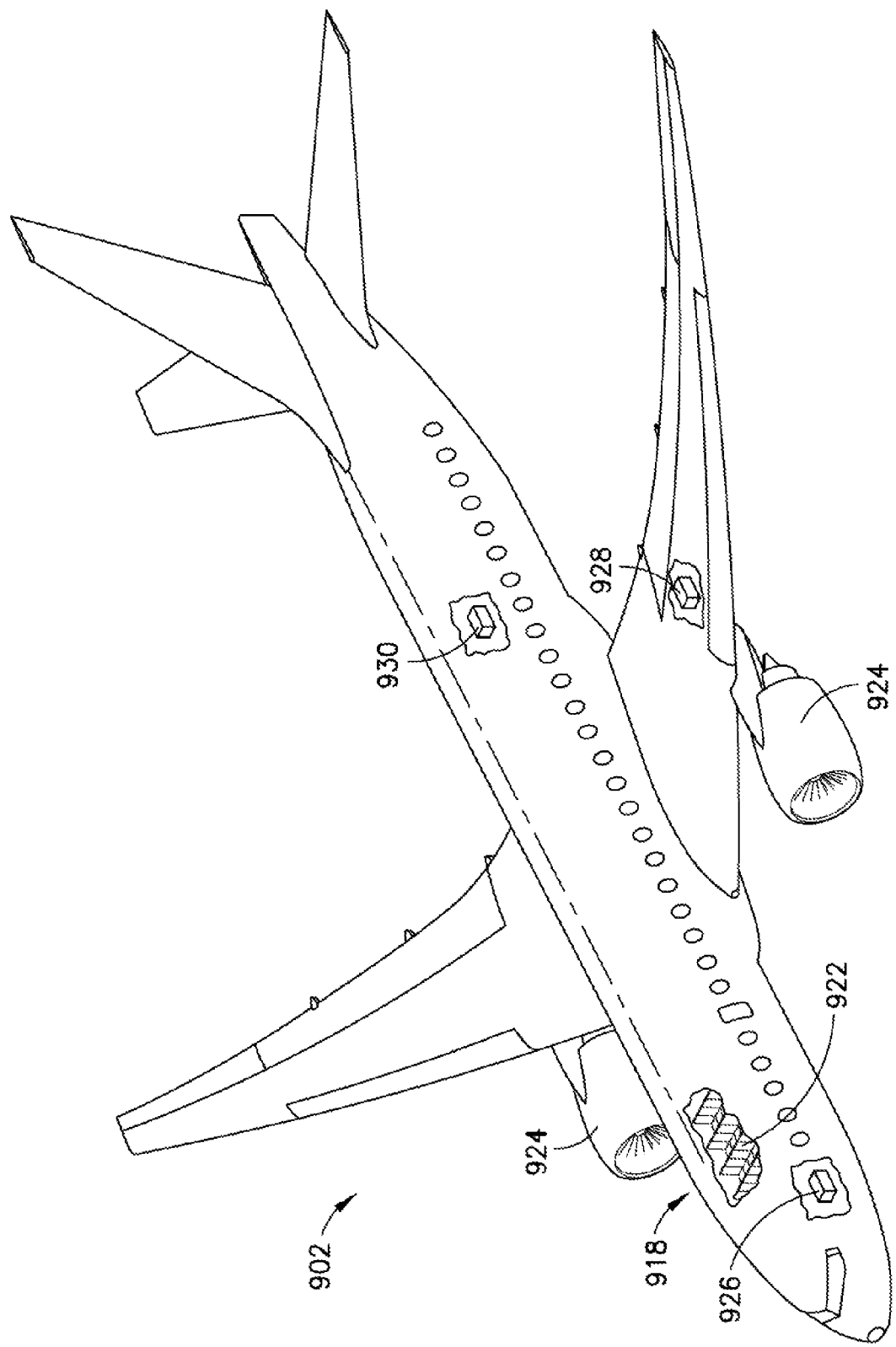

FIG. 9 is a schematic illustration of an aircraft including distributed vehicle systems.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring to FIG. 1, a block diagram of a vehicle 100 having a sound attenuating member 130 in accordance with aspects of the present disclosure is illustrated. The vehicle 100 is in one aspect an aircraft such as aircraft 902 illustrated in FIG. 9 where the sound attenuating member 130 is connected to an aircraft engine 201 (see FIG. 2A) that includes an aircraft engine nacelle 110 having a nacelle frame 110F to which one or more engine nacelle components 120 are attached. In other aspects the vehicle 100 is a land based, marine or other aerospace vehicle having a nacelle or cowling at least partially surrounding a turbine or having an exhaust in which the sound attenuating member 130 may be employed.

In one aspect, referring to FIGS. 1, 2A and 3, the engine nacelle components 120 include an inlet cowl 120A, a fan cowl 120B, one or more thrust reversers 120C, a primary nozzle 120D, an exhaust cone 120E and a core member 120F. The core member 120F, in one aspect, houses the turbine 200 while in other aspects forms part of the turbine 200. In other aspects the engine nacelle components 120 have any configuration for housing and or providing air and/or exhaust flow in and around the turbine 200. One or more sound attenuating members 130 are located in or around flow passages of the aircraft engine nacelle 110. For example, one or more sound attenuating members 130A, 130B are disposed in a bypass air duct 210 formed between, for example, the fan cowl 120B and the core member 120F and between the thrust reversers 120C and the core member 120F. In the example illustrated in FIG. 2A sound attenuating member 130A is disposed on or is integral to the thrust reversers 120C so as to substantially form an annular ring around, for example, the core member 120F. Sound attenuating member 130B is disposed on or is integral to the core member 120F so as to substantially form an annular ring around a surface 120FS of the core member 120F. Each of the sound attenuating members 130A, 130B is in fluid communication with a fluid flow 220 passing through the bypass air duct 210 as will be described below. In one aspect, one or more sound attenuating members 130C, 130D are in fluid communication with a fluid flow 225 passing through an engine exhaust duct 215 formed at least partially by the core member 120F and the exhaust cone 120E. As illustrated in FIG. 3, in one aspect, sound attenuating member 130C is disposed on or integral to the exhaust cone 120E. In one aspect, sound attenuating member 130D is disposed on or integral to the core member 120F so as to form an annular ring around at least a portion of the exhaust cone 120E.

In one aspect the sound attenuating members 130A, 103B, 130C, 130C are employed in conjunction with each other while in other aspects the sound attenuating members 130A, 103B, 130C, 130C are employed individually or in any combination thereof. While the sound attenuating members 130A, 103B, 130C, 130C are illustrated in the locations described above and illustrated in FIGS. 2A and 3, it is noted that, in other aspects, the sound attenuating members 130A, 103B, 130C, 130C are located at any portion of the aircraft engine nacelle 110 so as to be in fluid communication with a flow of fluid passing through engine 201 such as through the aircraft engine nacelle 110 and/or the turbine 200. While the sound attenuating member 130 is illustrated as being disposed on or integral to a curved or contoured surface of the aircraft engine nacelle 110, in other aspects the sound attenuating member 130 is disposed on a substantially flat/planar surface.

Referring to FIGS. 1, 2A, 2B, 2C and 2D each sound attenuating member 130 includes a perforated face member 140, a plurality of connecting members 150 and a backing member 170. In one aspect, one or more of the perforated face member 140, a plurality of connecting members 150 and a backing member 170 are constructed of titanium. In another aspect, one or more of the perforated face member 140, a plurality of connecting members 150 and a backing member 170 are constructed of a nickel alloy. In still other aspects, one or more of the perforated face member 140, a plurality of connecting members 150 and a backing member 170 are constructed of a ceramic matrix composite.

The perforated face member 140 includes a surface 141 that in one aspect, such as when sound attenuating member 130 is disposed in the location of sound attenuating member 130A and/or 130D, that forms a center aperture. In other aspects, the surface 141 forms, such as when the sound attenuating member 130 is disposed in the location of sound attenuating member 130B and/or 130C, a radially outward surface of a ring formed by the sound attenuating member 130. The surface 141 includes a plurality of perforations 142 that provide for fluid communication between a fluid flow, such as one or more of fluid flows 220, 225, and channels 160 formed by the plurality of connecting members 150. In one aspect, the plurality of perforations 142 provide the perforated face member 140 with a percent open area of about 15% or greater. In other aspects the percent open is about 15% or less. In one aspect, the perforated face member 140 is an expanded metal member while in other aspects, the perforations 142 are formed in the perforated face member 140 in any suitable manner such as by drilling, punching, stamping and/or cutting.

In one aspect, each of the plurality of connecting members 150 couples the perforated face member 140 to the backing member 170 to form a plurality of channels 160 that span from the perforated face member 140 to the backing member 170 where the connecting members 150 extend along a longitudinal axis (e.g., with respect to the length L of the channels 160) of each channel. In one aspect, the plurality of channels 160 are connected to an interior portion of an engine nacelle component 120 so that the plurality of channels 160 are oriented in a direction substantially normal to a direction 299 of fluid flow pressure drop passing through the aircraft engine 201. Referring to FIGS. 4A-4I, exemplary channel 160 configurations are illustrated. In one aspect, the connecting members 150 have a longitudinally extending sinewave configuration as illustrated in FIG. 4A. In one aspect the connecting members 150 extend linearly along the longitudinal axis of the channels 160 as illustrated in FIG. 4H. In one aspect, the connecting members form a truss core that extends along the longitudinal axis of each channel 160 as illustrated in FIG. 4I. In other aspects, the channels 160 include columns or posts 400 disposed between the connecting members 150 where the columns or posts also couple the perforated face member 140 to the backing member 170 as illustrated in FIG. 4B. In still other aspects, the channels 160 are formed by columns or posts 400 as illustrated in FIG. 4C where one or more channels are in fluid communication with each other. In other aspects, the connecting members 150 have any suitable configuration such as, for example, a triangle isogrid configuration as illustrated in FIG. 4D, an elongated triangle isogrid configuration as illustrated in FIG. 4E, an interrupted rectangular core configuration as illustrated in FIG. 4F and a rectangular core configuration as illustrated in FIG. 4G.

Referring again to FIGS. 1, 2A, 2B, 2C and 2D, in one aspect, a longitudinal length L of each channel 160 extends a full length of the engine nacelle component 120. For example, as illustrated in FIG. 2B, the thrust reverser 120C may include, for example, two halves or panels 120C1, 120C2 where the channels 160A, 160B extend a full length of their respective halves 120C1, 120C2. In one aspect, where the ends of the channels 160A, 160B abut each other, one channel 160A is isolated from the other channel 160B by a partition or wall 270, which in one aspect may be an end of the engine nacelle component 120. In other aspects, where the ends of the channels 160A, 160B abut each other, one channel 160A is in fluid communication with the other channel 160B where the ends of each channel are open (e.g. there is no partition or wall) and the channels are substantially aligned with each other so as to form a single substantially continuous channel. In one aspect, each of the channels 160 has a width W, in a direction substantially normal to a direction 299 of fluid flow pressure drop passing through the engine 201, such as through bypass air duct 210 or engine exhaust duct 215. In one aspect the width W is about one (1) inch while in other aspects the width is more or less than about one (1) inch. The width W substantially prevents sound propagation, inside the respective channel 160, substantially parallel to a surface 160S of the channel 160 in a direction substantially normal to the direction 299 of fluid flow pressure drop passing through the engine 201. For example, in one aspect, the width W prevents pressure driven backflow, upstream within the channel, back into the fluid flow 220, 225.

In one aspect, at least one septum layer 162 is disposed in one or more channels 160 between the perforated face member 140 and the backing member 170 where the at least one septum layer 162 divides each channel 160 into at least two portions 160C, 160D. In one aspect the at least one septum layer 162 includes perforations 163 that place the at least two portions 160C, 160D in fluid communication with each other. In one aspect one of the at least two portions 160C, 160D includes or otherwise forms a fluid (e.g. liquid) drainage path and is in fluid communication with a drain member 280. In one aspect the drain member 280 may also be provided in a sound attenuating member 130 where the channels 160 are not divided into portions as illustrated in FIG. 2A with respect to sound attenuating member 130B. In one aspect the drainage path may extend between channels and provide a path for liquid to flow from one channel 160 to another channel 160 (e.g., between channels 160) and ultimately exit the sound attenuating member 130 through the drain member 280.

In one aspect, a bulk absorber 161 is disposed in each of the channels 160 for attenuating sound produced by the aircraft engine 201. In one aspect, such as where each channel includes at least one septum layer 162, at least one of the portions 160C, 160D includes a bulk absorber 161A, 161B. In one aspect, each portion 160C, 160D includes the same type of bulk absorber 161A, 161B (e.g., both bulk absorbers 161A, 161B have the same characteristics) while in other aspects, each of the portions 160C, 160D includes dissimilar bulk absorbers 161A, 161B (e.g., bulk absorber 161A has different characteristics than bulk absorber 161B). In other aspects, one of the portions 160C, 160D includes the bulk absorber while the other portion 160C, 160D is empty (e.g. does not contain the bulk absorber 161). In one aspect the bulk absorber 161 comprises a high temperature bulk absorber material capable of withstanding temperatures from about 600° F. to about 1100° F., or from about 600° F. to about 800° F., or from about 800° F. to about 1100° F. In other aspects, the bulk absorber material is capable of withstanding temperatures above about 1100° F. In one aspect, the perforations 142 in the perforated face member 140 place the bulk absorber 161 in direct fluid communication with the fluid flow 220, 225 of the aircraft engine 201. In one aspect, one or more of the perforated face member 140 and backing member 170 includes an access panel 143, 171 that provides access to the bulk absorber 161 in each of the channels 160.

In one aspect, the sound attenuating members 130 described herein provide increased sound attenuation, as illustrated in FIG. 5, when compared to, for example, conventional aircraft engine liners such as liners including Helmholtz resonators that rely on passage of fluid through an aperture into an empty cavity for noise reduction. In accordance with the present disclosure, the perforations 142 in the perforated face member 140 can be larger than the Helmholtz apertures as it is the bulk absorber that attenuates the sound rather than a size of the cavity and/or a size of the aperture leading to the cavity. The perforations 142 in the perforated face member 140 can have any shape, size and or orientation (with respect to the fluid flow 220, 225) that provides for a predetermined percent open area which in one aspect is about 15% or greater, as described above. The aspects of the present disclosure, in one aspect, reduce an amount of acoustically treated area over the conventional liners (e.g., provides increased sound attenuation for a given amount of acoustically treated area). The bulk absorber 161 within the channels 160 of the present disclosure are, in one aspect, thermal insulators that may reduce the need for additional thermal insulation within the aircraft engine 201.

While the aspects of the present disclosure are described above with respect to an aircraft engine 201, in other aspects the sound attenuating members 130 may be integrated into the structure of the vehicle 100, such as in the structure of an aircraft or automobile cabin or passenger compartment, an engine compartment of an automobile or marine vessel or any other part of a vehicle that includes two skins joined together by channel members. For example, FIG. 6 illustrates a portion of an interior 922 an aircraft, such as the passenger cabin. A wall 601 of the passenger cabin is connected to an outer skin 600 of the aircraft by a frame or stringers 610 of the aircraft 902, where the frame or stringers 610 form channels that circumscribe, for example, the fuselage of the aircraft 902. The bulk absorber 161 is located within the channels formed by the stringers 610 and perforations 142 are provided in the wall 601 where, for example, at least the stringers 610 and the wall 601 form a sound attenuating member substantially similar to sound attenuating member 130 for attenuating the sound within the passenger cabin. In one aspect, the nacelle frame 110F includes frame members, such as stringers 610 having cavities or channel 160 therein and the bulk absorber 161 is disposed within the cavities or channel 160, where the bulk absorber 161 is in fluid communication with the fluid flow 220, 225

Referring to FIG. 7, an exemplary method of attenuating sound from an aircraft engine 201 will be described. In one aspect, the method includes flowing fluid through the aircraft engine 201, such as through the aircraft engine nacelle 110 (FIG. 7, Block 700). For example, during operation of the aircraft engine 201 fluid flows 220, 225 are provided through the bypass air duct 210 and the engine exhaust duct 215. A portion of the fluid flow 220, 225 is received in perforations 142 of the aircraft engine nacelle, such as in the perforated face member 140, so that the portion of the fluid flows 220, 225 flows through the perforations 142 into at least one channel 160 of the aircraft engine nacelle 110 (FIG. 7, Block 710). Acoustic waves are attenuated with the bulk absorber 161 disposed within each of the at least one channel 160 (FIG. 7, Block 720). In one aspect, attenuating the acoustic waves includes preventing sound propagation inside the at least one channel 160 parallel to the surface 160S of the channel in the direction of the pressure drop direction 299 of the fluid flow 220, 225. In one aspect, the bulk absorber 161 is heated with the portion of the fluid flow 220, 225 to vaporize liquids contained within the bulk absorber 161 (FIG. 7. Block 730). In one aspect, access to the bulk absorber 161 is provided through the surface 141 or the backing member 170 of the aircraft engine nacelle 110, such as through one or more of access panels 143, 171 (FIG. 7, Block 740). In one aspect, the bulk absorber 161 is inserted into each channel 160 by pulling the bulk absorber through the channel 160 while in other aspects the bulk absorber is inserted into each channel 160 by spraying or injecting the bulk absorber into the channel 160. In one aspect, the sound attenuating member 130 is formed in the net shape of the engine nacelle component 120 to which the sound attenuating member 130 is attached or integrated with. For example, the sound attenuating member 130A is formed in the net shape of the inner wall (e.g., the wall forming part of the bypass air duct 210) of the thrust reverser 120C. Similarly, the sound attenuating members 130B, 130C, 130D are, in one aspect, formed in the net shape of a respective one of the core member 120F and the exhaust cone 120E.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 800 as shown in FIG. 8 and an aircraft 902 as shown in FIG. 9. During pre-production, illustrative method 800 may include specification and design 804 of the aircraft 902 and material procurement 806. During production, component and subassembly manufacturing 808 and system integration 810 of the aircraft 902 take place. Thereafter, the aircraft 902 may go through certification and delivery 812 to be placed in service 814. While in service by a customer, the aircraft 902 is scheduled for routine maintenance and service 816 (which may also include modification, reconfiguration, refurbishment, and so on).

Each of the processes of the illustrative method 800 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, the aircraft 902 produced by the illustrative method 800 may include an airframe 918 with a plurality of high-level systems and an interior 922. Examples of high-level systems, which are distributed throughout the aircraft, include one or more of a propulsion system 924, an electrical power system 926, a hydraulic system 928, and an environmental system 930, one or more of which include sound attenuating members as described herein. Any number of other systems may be included. Although an aerospace example is shown, the principles of the invention may be applied to other industries, such as the automotive and maritime industries.

Apparatus and methods shown or described herein may be employed during any one or more of the stages of the manufacturing and service method 800. For example, components or subassemblies corresponding to component and subassembly manufacturing 808 may be fabricated or manufactured in a manner similar to components or subassemblies produced while the aircraft 902 is in service. Also, one or more aspects of the apparatus, method, or combination thereof may be utilized during the production states 808 and 810, for example, by substantially expediting assembly of or reducing the cost of an aircraft 902. Similarly, one or more aspects of the apparatus or method realizations, or a combination thereof, may be utilized, for example and without limitation, while the aircraft 902 is in service, e.g., operation, maintenance and service 816.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In one or more aspects of the present disclosure an aircraft engine sound attenuation apparatus comprises: a perforated face member; a backing member; a plurality of connecting members coupling the perforated face member to the backing member to form a plurality of channels spanning from the perforated face member to the backing member; and a bulk absorber disposed in each of the plurality of channels; wherein the plurality of channels are connected to an interior portion of an aircraft engine nacelle component so that the plurality of channels are oriented in a direction substantially normal to a direction of fluid flow pressure drop passing through the aircraft engine.

In one or more aspects of the present disclosure a longitudinal length of each channel extends a full length of the aircraft engine nacelle component.

In one or more aspects of the present disclosure the aircraft engine sound attenuation apparatus further comprises at least one septum layer disposed between the perforated face member and the backing member where the at least one septum layer divides each channel into at least two portions.

In one or more aspects of the present disclosure the at least two portions are in fluid communication with each other.

In one or more aspects of the present disclosure the bulk absorber is disposed in at least one of the at least two portions of each channel.

In one or more aspects of the present disclosure the bulk absorbers comprises a first bulk absorber and a second bulk absorber that is different than the first bulk absorber, the first bulk absorber being disposed in one of the at least two portions and the second bulk absorber being disposed in another of the at least two portions.

In one or more aspects of the present disclosure one of the at least two portions comprises a liquid drainage path.

In one or more aspects of the present disclosure the each of the plurality of connecting members has a longitudinally extending sinewave configuration.

In one or more aspects of the present disclosure each of the plurality of connecting members extends linearly along a longitudinal axis of each channel.

In one or more aspects of the present disclosure the plurality of connecting members forms a truss core that extends along a longitudinal axis of each channel.

In one or more aspects of the present disclosure each channel has a width, in the direction substantially normal to the direction of fluid flow pressure drop passing through the aircraft engine, that prevents sound propagation inside the channel substantially parallel to a surface of the channel in the direction substantially normal to the direction of fluid flow pressure drop passing through the aircraft engine.

In one or more aspects of the present disclosure the perforated face member has a percent open area of about 15 percent or greater.

In one or more aspects of the present disclosure the perforated face member includes perforations that place the bulk absorber in each channel in fluid communication with the fluid flow.

In one or more aspects of the present disclosure the perforated face member, the backing member and the plurality of connecting members comprise titanium.

In one or more aspects of the present disclosure the perforated face member, the backing member and the plurality of connecting members comprise a nickel alloy.

In one or more aspects of the present disclosure the perforated face member, the backing member and the plurality of connecting members comprise a ceramic matrix composite.

In one or more aspects of the present disclosure at least one of the perforated face member and the backing member includes an access panel that provides access to the bulk absorber in each channel.

In one or more aspects of the present disclosure an aircraft engine comprises: a nacelle having a nacelle frame to which a plurality of nacelle components are attached; at least one sound attenuating member, each sound attenuating member including a perforated face member, a backing member, a plurality of connecting members coupling the perforated face member to the backing member to form a plurality of channels spanning from the perforated face member to the backing member; and a bulk absorber disposed in each of the plurality of channels; wherein the plurality of channels are connected to an interior portion of a respective one of the plurality of nacelle components so that the plurality of channels are oriented in a direction substantially normal to a direction of fluid flow pressure drop passing through the aircraft engine.

In one or more aspects of the present disclosure a longitudinal length of each channel extends a full length of the respective one of the plurality of nacelle components.

In one or more aspects of the present disclosure the nacelle frame includes frame members having cavities therein and the bulk absorber is disposed within the cavities, the bulk absorber being in fluid communication with the fluid flow.

In one or more aspects of the present disclosure the plurality of nacelle components includes at least one thrust reverser panel and one of the at least one sound attenuating member is coupled to each of the at least one thrust reverser panel.

In one or more aspects of the present disclosure the at least one sound attenuating member further includes at least one septum layer disposed between the perforated face member and unperforated backing member where the at least one septum layer divides each channel into at least two portions.

In one or more aspects of the present disclosure the at least two portions are in fluid communication with each other.

In one or more aspects of the present disclosure the bulk absorber is disposed in at least one of the at least two portions of each channel.

In one or more aspects of the present disclosure the bulk absorbers comprises a first bulk absorber and a second bulk absorber that is different than the first bulk absorber, the first bulk absorber being disposed in one of the at least two portions and the second bulk absorber being disposed in another of the at least two portions.

In one or more aspects of the present disclosure one of the at least two portions comprises a liquid drainage path.

In one or more aspects of the present disclosure each of the plurality of connecting members has a longitudinally extending sinewave configuration.

In one or more aspects of the present disclosure each of the plurality of connecting members extends linearly along a longitudinal axis of each channel.

In one or more aspects of the present disclosure the plurality of connecting members forms a truss core that extends along a longitudinal axis of each channel.

In one or more aspects of the present disclosure the at least one sound attenuating member is locally reacting where each channel has a width, in the direction of fluid flow pressure drop passing through the aircraft engine, that prevents sound propagation inside the channel substantially parallel to a surface of the channel in the direction of fluid flow pressure drop passing through the aircraft engine.

In one or more aspects of the present disclosure the perforated face member has a percent open area of about 15 percent or greater.

In one or more aspects of the present disclosure the perforated face member includes perforations that place the bulk absorber in each channel in fluid communication with the fluid flow.

In one or more aspects of the present disclosure each channel of one of the at least one sound attenuating member are in fluid communication with a corresponding adjacent channel of a second one of the at least one sound attenuating member.

In one or more aspects of the present disclosure the perforated face member, the backing member and the plurality of connecting members comprise titanium.

In one or more aspects of the present disclosure the perforated face member, the backing member and the plurality of connecting members comprise a nickel alloy.

In one or more aspects of the present disclosure the perforated face member, the backing member and the plurality of connecting members comprise a ceramic matrix composite.

In one or more aspects of the present disclosure at least one of the perforated face member and the backing member includes an access panel that provides access to the bulk absorber in each channel.

In one or more aspects of the present disclosure a method for aircraft engine sound attenuation comprises: flowing fluid through an aircraft engine nacelle; receiving at least a portion of the fluid in perforations of the aircraft engine nacelle so that the portion of the fluid flows through the perforations into at least one channel of the aircraft engine nacelle; and attenuating acoustic waves with a bulk absorber disposed within each of the at least one channel.

In one or more aspects of the present disclosure attenuating the acoustic waves includes preventing sound propagation inside the channel parallel to a surface of the at least one channel in a direction of a pressure drop direction of the fluid.

In one or more aspects of the present disclosure the method further comprises heating the bulk absorber with the portion of the fluid to vaporize liquids contained within the bulk absorber.

In one or more aspects of the present disclosure the method further comprises vaporizing the liquids contained within the bulk absorber with heat, from an engine core member disposed within the aircraft engine nacelle, conducting through a backing member of the aircraft engine nacelle.

In one or more aspects of the present disclosure the method further comprises providing access to the bulk absorber through a surface of the aircraft engine nacelle.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. An aircraft engine sound attenuation apparatus comprising:
  a perforated face member;
  a backing member;
  a plurality of connecting members coupling the perforated face member to the backing member to form a plurality of channels spanning from the perforated face member to the backing member; and
  a bulk absorber disposed in each of the plurality of channels;
  wherein the plurality of channels are connected to an interior portion of an aircraft engine nacelle component so that the plurality of channels are oriented in a direction substantially normal to a direction of fluid flow pressure drop passing through the aircraft engine, and each channel has a width, in the direction substantially normal to the direction of fluid flow pressure drop passing through the aircraft engine, the at least one of prevents or mitigates sound propagation inside the channel substantially parallel to a surface of the channel in the direction substantially normal to the direction of fluid flow pressure drop passing through the aircraft engine.

2. The aircraft engine sound attenuation apparatus of claim 1, wherein a longitudinal length of each channel extends a full length of the aircraft engine nacelle component.

3. The aircraft engine sound attenuation apparatus of claim 1, further comprising at least one septum layer disposed between the perforated face member and the backing member where the at least one septum layer divides each channel into at least two portions.

4. The aircraft engine sound attenuation apparatus of claim 1, wherein each of the plurality of connecting members extends radially from the perforated face member so as to form a wall of a respective channel where the wall has a circumferentially extending sinewave configuration that undulates in a circumferential direction around the perforated face member.

5. The aircraft engine sound attenuation apparatus of claim 1, wherein each of the plurality of connecting members extends linearly along a longitudinal axis of each channel.

6. The aircraft engine sound attenuation apparatus of claim 1, wherein the plurality of connecting members forms a truss core that extends along a longitudinal axis of each channel.

7. The aircraft engine sound attenuation apparatus of claim 1, wherein the perforated face member includes perforations that place the bulk absorber in each channel in fluid communication with the fluid flow.

8. An aircraft engine comprising:
  a nacelle having a nacelle frame to which a plurality of nacelle components are attached;
  at least one sound attenuating member, each sound attenuating member including
    a perforated face member,
    a backing member,
    a plurality of connecting members coupling the perforated face member to the backing member to form a plurality of channels spanning from the perforated face member to the backing member; and
    a bulk absorber disposed in each of the plurality of channels;
  wherein the plurality of channels are connected to an interior portion of a respective one of the plurality of nacelle components so that the plurality of channels are oriented in a direction substantially normal to a direction of fluid flow pressure drop passing through the aircraft engine, and each channel has a width, in the direction substantially normal to the direction of fluid flow pressure drop passing through the aircraft engine, that at least one of prevents or mitigates sound propagation inside the channel substantially parallel to a surface of the channel in the direction substantially normal to the direction of fluid flow pressure drop passing through the aircraft engine.

9. The aircraft engine of claim 8, wherein a longitudinal length of each channel extends a full length of the respective one of the plurality of nacelle components.

10. The aircraft engine of claim 8, wherein the nacelle frame includes frame members having cavities therein and the bulk absorber is disposed within the cavities, the bulk absorber being in fluid communication with the fluid flow.

11. The aircraft engine of claim 8, wherein the plurality of nacelle components includes at least one thrust reverser panel and one of the at least one sound attenuating member is coupled to each of the at least one thrust reverser panel.

12. The aircraft engine of claim 8, wherein the at least one sound attenuating member further includes at least one septum layer disposed between the perforated face member and unperforated backing member where the at least one septum layer divides each channel into at least two portions.

13. The aircraft engine of claim 8, wherein the perforated face member includes perforations that place the bulk absorber in each channel in fluid communication with the fluid flow.

14. The aircraft engine of claim 8, wherein each channel of one of the at least one sound attenuating member are in fluid communication with a corresponding adjacent channel of a second one of the at least sound attenuating member.

15. The aircraft engine of claim 8, wherein at least one of the perforated face member and the backing member includes an access panel that is configured for passage of the bulk absorber through the access panel to provide access to the bulk absorber in each channel.

16. A method for aircraft engine sound attenuation, the method comprising:
flowing fluid through an aircraft engine nacelle;
receiving at least a portion of the fluid in perforations of the aircraft engine nacelle so that the portion of the fluid flows through the perforations into at least one channel of the aircraft engine nacelle; and
attenuating acoustic waves with a bulk absorber disposed within each of the at least one channel where sound propagation inside the channel parallel to a surface of the at least one channel, in a direction of fluid flow pressure drop passing through the aircraft engine, is at least one of prevented or mitigated by a width of the at least one channel, the width being in a direction substantially normal to the direction of fluid flow pressure drop passing through the aircraft engine.

17. The method of claim 16, further comprising heating the bulk absorber with the portion of the fluid to vaporize liquids contained within the bulk absorber.

18. The method of claim 17, further comprising vaporizing the liquids contained within the bulk absorber with heat, from an engine core member disposed within the aircraft engine nacelle, conducting through a backing member of the aircraft engine nacelle.

19. The method of claim 16, further comprising providing access to the bulk absorber through a surface of the aircraft engine nacelle.

20. The aircraft engine sound attenuation apparatus of claim 3, further comprising a liquid drainage path disposed in one of the at least two portions, the liquid drainage with being configured to evacuate liquids from the aircraft engine sound attenuation apparatus.

21. The aircraft engine sound attenuation apparatus of claim 3, wherein the bulk absorber comprises a first hulk absorber disposed in a first one of the at least two portions and a second bulk absorber disposed in a second one of the at least two portions, the second bulk absorber being different than the first bulk absorber.

* * * * *